United States Patent
Muto et al.

[11] 3,871,746
[45] Mar. 18, 1975

[54] LIQUID CRYSTAL CELL

[75] Inventors: Ryujiro Muto; Shigemasa Furuuchi, both of Yokohama; Hiroshi Ukihashi, Tokyo; Katsuo Uchijima; Hiromichi Nishimura, both of Yokohama, all of Japan

[73] Assignee: Asahi Glass Company, Ltd., Tokyo, Japan

[22] Filed: June 6, 1973

[21] Appl. No.: 367,527

[30] Foreign Application Priority Data
June 6, 1972 Japan.............................. 47-55681

[52] U.S. Cl............ 350/160 LC, 23/230 LC, 161/5, 161/45, 161/189, 161/410, 252/408 LC
[51] Int. Cl................................................ G02f 1/34
[58] Field of Search.......... 350/160 LC; 23/230 LC; 252/408 LC; 161/45, 189, 1, 586, 408–410

[56] References Cited
UNITED STATES PATENTS

| | | | |
|---|---|---|---|
| 3,441,513 | 4/1969 | Woodmansee | 23/230 LC |
| 3,594,126 | 7/1971 | Fergason et al. | 23/230 LC |
| 3,600,061 | 8/1971 | Heilmeier | 350/160 LC |
| 3,620,889 | 11/1971 | Baltzer | 230/230 LC |
| 3,625,591 | 12/1971 | Freiser | 350/160 LC |
| 3,647,279 | 3/1972 | Sharpless et al. | 350/160 LC |
| 3,661,444 | 5/1972 | Matthies | 350/160 LC |
| 3,765,747 | 10/1973 | Pankratz et al. | 350/160 LC |
| 3,781,087 | 12/1973 | Nagasaki et al. | 350/160 LC |

*Primary Examiner*—Harold Ansher
*Attorney, Agent, or Firm*—Oblon, Fisher, Spivak, McClelland & Maier

[57] ABSTRACT

A liquid crystal cell which is formed from a pair of plates, at least one of which is transparent, and wherein the space between said plates is filled with a liquid crystal material and wherein said plates are sealed with a sealant made of tetrafluoroethylene-ethylene-copolymer or a chlorotrifluoroethylene-ethylene-copolymer.

10 Claims, 3 Drawing Figures

3,871,746

LIQUID CRYSTAL CELL

BACKGROUND OF THE INVENTION

1. Field of the Invention

This invention relates to a liquid crystal cell. More particularly, it relates to a liquid crystal cell which is chemically, mechanically and electrically stable, is hermetically sealed and has a uniform space between the front and back plates.

2. Description of the Prior Art

Heretofore, liquid crystal cells which are used for optical display devices or light valves have been prepared by sealing two plates with a sealant. The plates are separated by a spacer to hold the plates at a predetermined distance from one another. Usually liquid crystal inorganic sealants have been used for this purpose, such as low-melting glass frit or an organic bonding agent such as an epoxy type sealant or heat sealing type film. Because the sealant is an important factor in determining the lifetime of the liquid crystal cell, it is important that the sealant have a sufficient long lifetime. However, completely satisfactory sealants have not been reported.

Because of the difficulties encountered in attempts to find a suitable sealant for liquid crystal cells, practical utilization of optical display devices or light valves using a liquid crystal material has not been realized. It has been found that when an inorganic sealant is used in the conventional method of sealing the cell, fewer adverse affects are found which influence the life of liquid crystal cell than when an organic sealant is used. However, inorganic sealants complicate the sealing operation since the workability of such sealants is low. On the other hand, when an organic sealant is used, sealing operations are comparatively easy. However, organic sealants such as epoxy sealants adversely affect the liquid crystal material of the cell causing deterioration of the liquid crystal material through the formation of bubbles or by discoloration.

Previously, heat sealing films of such materials as nylon, epoxy, butyral, or polyethylene have been proposed in order to seal the cells. However, the known heat sealing films have the disadvantage of having high moisture permeability and, accordingly the moisture content of the liquid crystal material is increased by permeation through the film over a sustained period of time. Bubbles thereby tend to form and the operability of the liquid crystal meterial deteriorates.

A need, therefore, exists for a sealant for application in liquid crystal cells which maintains the integrity of the seal between the plates of the cell for long periods of time, and which does not adversely affect the cell upon contact with the liquid crystal material.

SUMMARY OF THE INVENTION

Accordingly, one object of this invention is to provide a liquid crystal cell which is chemically, mechanically and electrically stable and is hermetically sealed.

Another object of this invention is to provide a liquid crystal cell which has a uniform thickness between the plates of the cell within which is sealed the liquid crystal material.

Briefly, these objects and other objects of this invention as hereinafter will become readily apparent can be attained by the use of a tetrafluoroethylene-ethylene copolymer, or a chlorotrifuloroethylene-ethylene copolymer as a sealant for the opposing plates of a liquid crystal cell. Preferably a spacing element, which is placed between the plates of the cell, is incorporated in the sealant of the tetrafluoroethylene-ethylene copolymer or the chlorotrifluoro-ethylene-ethylene copolymer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
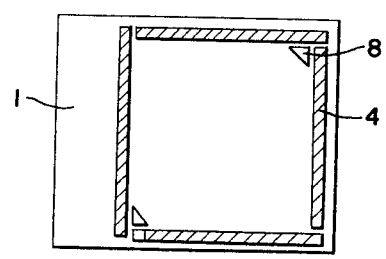
FIG. 1 is a plane view of a front plate of a liquid crystal cell which shows via the shaded regions where the sealant of the tetrafluoroethylene-ethylene copolymer is placed.

The tetrafluoroethylene-ethylene copolymer (hereinafter referred to as $C_2F_4$-$C_2H_4$ copolymer) and the chlorotrifluoroethylene-ethylene copolymer (hereinafter referred to as $C_2ClF_3$-$C_2H_4$ copolymer) used in this invention exhibit no reactivity with liquid crystal materials and have low moisture permeability. In addition, the copolymers have excellent chemical and mechanical properties as well as electrical properties particularly dielectric properties. Moreover, the copolymers can be satisfactorily molded and also the overall adhesiveness to the plate is improved by the use of the $C_2F_4$-$C_2H_4$ copolymer or the $C_2ClF_3$-$C_2H_4$ copolymer.

The optimum $C_2F_4$-$C_2H_4$ copolymers or $C_2ClF_3$-$C_2H_4$ copolymers for this invention are those which have a 60 – 30 mole percent $C_2H_4$ component content in the copolymers and have a volumetric flow rate, as defined below, of 30 – 300 $mm^3$/sec. the term "volumetric flow rate" is defined as the extrusion of a one gram sample of copolymer by a flow tester at a predetermined temperature from a nozzle having a diameter of 1 mm and a land of 2 mm under a pressure of 30 $kg/cm^2$. The volume of the molten polymer extruded in 1 second is defined as the volumetric flow rate, and the unit is $mm^3$/second. The predetermined temperature is selected over a range so that good moldability is obtained. The temperature selected is in the range between the initiation of flow of the copolymer and the decomposition temperature of the copolymer. Preferably the temperature selected is near the flow initiation temperature and is in the range of 260°–360°C for the $C_2F_4$ - $C_2H_4$ copolymer and in the range of 240°–320°C for the $C_2ClF_3$-$C_2H_4$ copolymer. Of course, temperatures greater than the thermal decomposition temperature of the copolymers are avoided.

The liquid crystal cell of this invention has excellent chemical, mechanical and electrical properties and especially possesses low moisture permeability. It also achieves high reliability with excellent moldability and adhesiveness. These properties permit hermetic sealing of any shape and size of liquid crystal cell with the copolymers of this invention. Thus, simple and practical sealing of the cells can be accomplished with the $C_2F_4$ - $C_2H_4$ copolymer or the $C_2ClF_3$ - $C_2H_4$ copolymer.

The content of the ethylene component in the $C_2F_4$-$C_2H_4$ copolymer or the $C_2ClF_3$ - $C_2H_4$ copolymer is preferably from 30 – 60 mole percent. If the tetrafluoroethylene content or the chlorotrifluoroethylene content of the copolymer is too low, the chemical resistance and the thermal stability of the copolymer are insufficient. On the other hand, if the tetrafluoroethylene content or the chlorotrifluoroethylene content is too high, the moldability and adhesiveness of the copolymers decrease. It is especially preferred to use copolymers containing an ethylene content of 40 – 55 mole percent.

The volumetric flow rate of the copolymer is limited from the viewpoint of moldability and is usually in the range of 30 – 300 mm$^3$/second, especially 40 – 160 mm$^3$/second. If the volumetric flow rate is outside of this range, the moldability, adhesiveness, mechanical strength dielectric constant, thermal stability and the like decrease.

The $C_2F_4$-$C_2H_4$ copolymer used in this invention has a flow initiation temperature of about 260 – 300°C and a thermal decomposition temperature of about 340 – 360°C. The optimum $C_2F_4$-$C_2H_4$ copolymers used in this invention have flow initiation temperatures ranging from 270 – 290°C and a thermal decomposition temperature range of 345 – 355°C. The heat sealing temperature range between the flow initiation temperature of the particular copolymer used and its thermal decomposition temperature is usually in the range of 260°– 360°C, especially 270° – 345°C. The $C_2ClF_3$-$C_2H_4$ copolymer used in this invention has a flow initiation temperature of about 240° – 270°C and a thermal decomposition temperature of 310° – 340°C. The optimum $C_2ClF_3$-$C_2H_4$ copolymer used in this invention has a flow initiation temperature of 250° – 265°C and a thermal decomposition temperature of 320° – 335°C. Usually, the temperature for heat sealing of the cells is in the range of 240° – 340°C, especially 250° – 320°C.

The $C_2F_4$-$C_2H_4$ copolymer or the $C_2ClF_3$-$C_2H_4$ copolymer can be prepared by various polymerization procedures such as catalytic emulsion polymerization, suspension polymerization, catalytic solution polymerization, radiation induced polymerization, or the like. Generally the chlorotrifluoroethylene-ethylene mole ratio and the tetrafluoroethylene-ethylene mole ratio range from 40/60 to 70/30. It is also possible to add a small amount of another comonomer such as propylene, isobutylene, vinylfluoride, hexafluoropropylene, perfluorovinyl ether or a modifier in the polymerization of tetrafluoroethylene and ethylene.

In this invention, the liquid crystal cell plates can be made of any suitable inorganic material such as glass, ceramics or metal, or any suitable organic material selected from the broad group of plastic materials. The front cell plate is usually a transparent material such as glass, and the back plate can be either transparent or opaque. When a field effect liquid crystal material is placed in the liquid crystal cell, the plates of the cell are usually coated with an electroconductive film, preferably a transparent electro-conductive film such as $SnO_2$ and/or $In_2O_3$, by a vacuum deposition method. It is also possible to use plates coated with an opaque electroconductive film such as aluminum. The electroconductive film can be completely coated over the plates or it can be placed on the plates in appropriate patterns such as numeral figures, X-Y matrices for showing letters, figures, pictures or the like.

In the preparation of the liquid crystal cell of this invention, the $C_2F_4$-$C_2H_4$ copolymer or the $C_2ClF_3$-$C_2H_4$ copolymer is coated over those portions of one of the cell plates which are most appropriate for sealing such as the peripheral areas of the plate in any appropriate thickness or shape, and the other plate is applied to the coated plate. The two plates are heated at 240° – 360°C under pressure, to complete the fabrication of the liquid crystal cell. In this invention, when the plates are heat-sealed with a copolymer film of about 50μ thick, the space between the cell plates can be maintained within the range of 15 to 20μ. In order to uniformly maintain the distance between the plates of the liquid crystal cell at a predetermined thickness, a spacing element is preferably placed between the plates with the $C_2F_4$-$C_2H_4$ copolymer or the $C_2ClF_3$-$C_2H_4$ copolymer. By carefully selecting the amount of copolymer and the thickness of the spacing element, any desired spacing between the plates of the cell can be achieved. Because the copolymer completely coats the entire surface area of the spacing element, the spacing element does not come in contact with the liquid crystal material so that the liquid crystal material is not adversely affected by the spacing element. Thus, the workability of the completed cell is good and mass production of liquid crystal cells can be readily achieved. The spacing element incorporated in the cell with the copolymer of this invention, can be any suitable granular element such as glass beads made of soda-lime-silicate, ceramic beads made of alumina, metal balls, plastic beads, glass fibers, metallic fibers, whiskers and other fibrous elements, fine ceramic fragments and the like. From the viewpoint of the spacing element, optimum results are obtained when granular elements are used, especially glass beads or ceramic beads having diameters ranging from 5 – 50μ.

When the copolymer film is placed around the peripheral areas of the completed cell, the two corners which are not provided with inlet openings and which are diagonally disposed are coated with a wide coating of copolymer film, or a small piece of copolymer film is placed at these corners. Thus, when the plates are sealed by heat treatment, the sealing copolymer film in these corners becomes smooth instead of remaining as sharp angles. This prevents the formation and subsequent retention of gas bubbles in these corners and thus the lifetime of the liquid crystal material is maintained and an ideal liquid crystal cell results.

Figure 2:
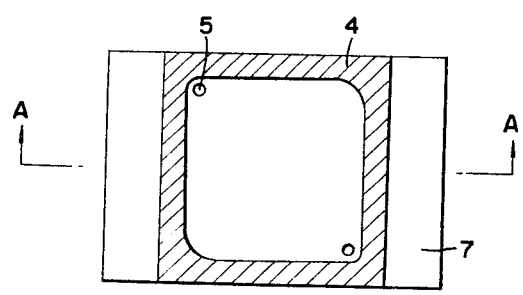
FIG. 2 is a plane view of a liquid crystal cell.
Figure 3:
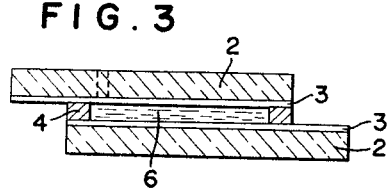
FIG. 3 is a sectional view taken along the line A—A of FIG. 2 which shows the cell filled with a liquid crystal material.

The drawings are schematic views which illustrate one embodiment of this invention. FIG. 1 is a plane view of the front plate 1 coated with a film 4 of $C_2F_4$-$C_2H_4$ copolymer or $C_2ClF_3H_4$ copolymer over the peripheral regions of the cell. FIG. 2 is a plane view of the liquid crystal cell which is prepared by placing the back plate 7 over the front plate of FIG. 1, and compressing the plates together with a clamp while being heated at 330°C for 20 minutes. FIG. 3 is a sectional view taken along the line A—A of FIG. 2.

In this embodiment of the cell the front plate 1 consists of a glass plate 2 coated with an electrodconductive film 3 and the cell is filled with the liquid crystal material 6 from the inlet 5 on the back plate 7. FIG. 2 further shows the smoothness of the two corners diagonally disposed which are not provided with inlet openings. In this embodiment, the corners were smoothed or rounded by small pieces of the film 8 which were placed in each corner before the cell was heat sealed.

Having now generally described the invention, a further understanding can be attained by reference to certain specific Examples which are provided herein for purposes of illustration only and are not intended to be limiting in any manner.

EXAMPLE 1

A film of tetrafluoroethylene-ethylene copolymer ($C_2F_4 : C_2H_4 = 53 : 47$, volumetric flow rate = 80 mm$^3$/sec. at 300°C) with a thickness of 50$\mu$ was placed over the peripheral areas of a front plate, and a back plate was applied to the front plate. The combined plates were compressed with a clamp under a pressure of 1-2 kg/cm$^2$ and were heated at 330°C for 20 minutes to yield a sealed cell. The thickness of the cell was 15 - 20$\mu$.

EXAMPLE 2

A film of chlorotrifluoroethylene-ethylene copolymer ($C_2ClF_3 : C_2H_4 = 51 : 49$, volumetric flow rate = 75 mm$^3$/sec. at 280°C) with a thickness of 50$\mu$ was placed over the peripheral areas of a front plate, and a back plate was applied to the front plate. The combined plates were compressed with a clamp under a pressure of 1-2 kg and were heated at 280°C for 15 minutes to yield a sealed cell. The thickness of the cell was 15 - 20$\mu$.

EXAMPLE 3

A 2 kg amount of the tetrafluoroethylene-ethylene copolymer of Example 1 was mixed with one gram of glass beads having a diameter of 15-10$\mu$ and the mixture was extruded as a fiber having a diameter of 200$\mu$. The fibrous material was placed over the peripheral areas of the front plate and a back plate was applied to the front plate and the plates were heat sealed. The distance between the front and back plates of the cell was 16$\mu \pm 1\mu$.

EXAMPLE 4

A liquid crystal material (p-methoxy benzylidene p. n-butyl aniline and p-ethoxy benzylidene p. n-butyl aniline = 1 : 1) was placed in a cell sealed with the $C_2F_4$-$C_2H_4$ copolymer of Example 1 or in a cell sealed with the $C_2ClF_3$-$C_2H_4$ copolymer of Example 2. A DC voltage of 30 volts was continuously applied to the completed crystal cell for the lifetime test. After 5,000 hours of operation, normal cell operations could still be conducted.

A reference cell was also tested which contained a sealant of nylon film and was filled with the same liquid crystal material. A DC voltage of 30 volts was continuously applied to the liquid crystal cell for the lifetime test. After 600 hours of operation, bubbles formed in the cell.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. In a liquid crystal cell filled with a liquid crystal material between the pair of plates sealed with a sealant and disposed at a designated distance from one another by a spacing element therefor, the improvement which comprises the use of a sealant of tetrafluoroethylene-ethylene copolymer or chlorotrifluoroethylene-ethylene copolymer.

2. The liquid crystal cell of claim 1, wherein the copolymer is a tetrafluoroethylene-ethylene copolymer having a mole ratio of tetrafluoroethylene component to ethylene component ranging from 40/60 – 70/30 and a volumetric flow rate of 30 – 300 mm$^3$/sec.

3. The liquid crystal cell of claim 1, wherein the copolymer is a chlorotrifluoroethylene-ethylene copolymer having a mole ratio of chlorotrifluoroethylene component to ethylene component ranging from 40/60 – 70/30 and a volumetric flow rate of 30 – 300 mm$^3$/sec..

4. The liquid crystal cell of claim 1, wherein the plates of said liquid crystal cell are sealed with the combination of said spacing element with the tetrafluoroethylene-ethylene copolymer or the chlorotrifluoroethylene-ethylene copolymer.

5. The liquid crystal cell of claim 2, wherein said spacing element is used in combination with said sealant.

6. The liquid crystal cell of claim 1, wherein said spacing element is used in combination with said sealant.

7. The liquid crystal cell of claim 4, wherein said spacing element is glass beads having an average diameter of 5 – 50$\mu$.

8. The liquid crystal cell of claim 4, wherein said spacing element is ceramic beads having an average diameter of 5 – 50$\mu$.

9. The liquid crystal cell of claim 4, wherein said spacing element is metal balls having an average diameter of 5 – 50$\mu$.

10. The liquid crystal cell of claim 4, wherein said spacing element is plastic beads having an average diameter of 5 – 50$\mu$.

* * * * *